Figure 1:
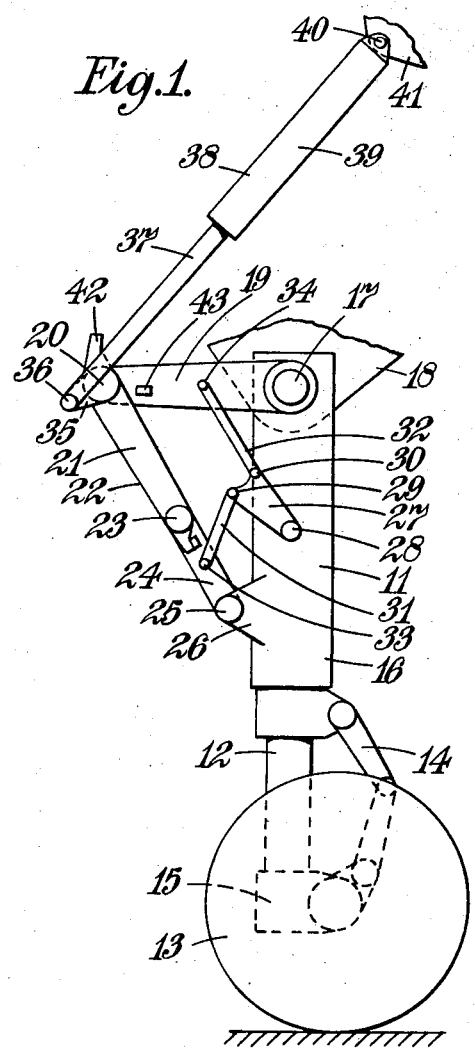

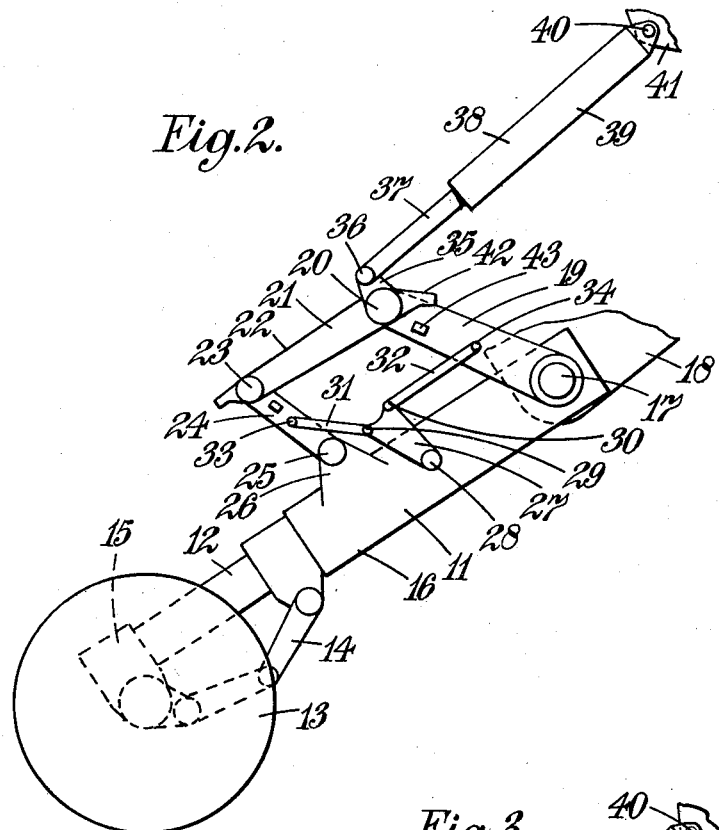
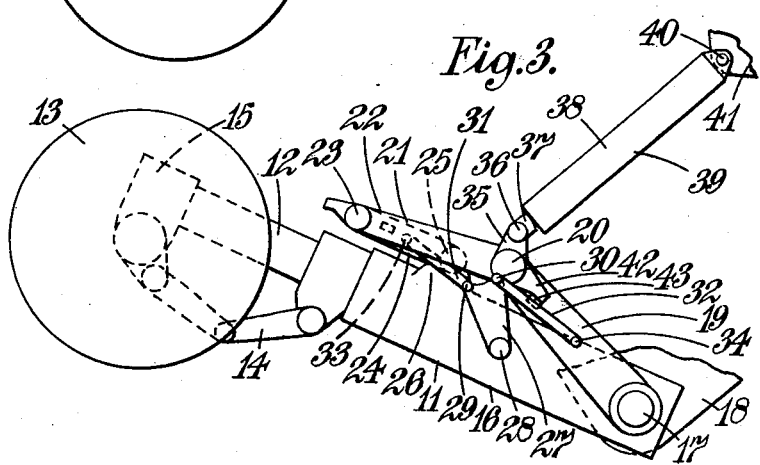

United States Patent Office 2,967,033
Patented Jan. 3, 1961

2,967,033

AIRCRAFT UNDERCARRIAGE

Kenneth Thomas Peers Langdon, St. Albans, England, assignor to Rotol Limited, Gloucester, England, a British company Filed Nov. 20, 1958, Ser. No. 775,166

Claims priority, application Great Britain Dec. 13, 1957

8 Claims. (Cl. 244—102)

This invention relates to an aircraft undercarriage and is concerned with a retraction mechanism therefor.

According to one aspect of the invention there is provided an undercarriage retraction mechanism comprising a main strut pivoted or adapted to be pivoted at one end to a fixed part of an aircraft structure and a retraction jack pivoted, or adapted to be pivoted, to a fixed part of the aircraft structure at a point remote from that to which the main strut is pivoted, said mechanism being characterised by a main retraction linkage connected for movement by the retraction jack and including a stabilising arm pivoted to the main strut and two interconnected alignable links, one of which is pivoted to the main strut and the other of which is pivoted to the stabilising arm, and by a subsidiary linkage to ensure that every point on the main linkage moves along a predetermined locus with respect to every other point on the main linkage.

According to another aspect of the invention there is provided an undercarriage retraction mechanism comprising a quadrilateral linkage having four links each of which is pivoted to two adjacent links about spaced parallel pivot axes, one of said links being also pivoted about a fixed pivot axis to a fixed structure, retraction means for moving a point on the linkage on a locus fixed with respect to said fixed structure, which locus is other than a circular arc centered on the fixed pivot axis, and a subsidiary linkage connected to three links of the quadrilateral linkage to ensure that every point on the quadrilateral linkage moves along a predetermined locus with respect to every other point on the quadrilateral linkage, the arrangement being such that said quadrilateral linkage forms a triangle in the extended position of the retraction mechanism, one side of which triangle is constituted by two links aligned with one another.

Preferably, the link pivoted to the fixed structure bounds one side of the triangle formed by the quadrilateral linkage when the retraction mechanism is in the extended position, and this link carries ground engaging means at its end remote from the fixed pivot axis. For brevity the links of the quadrilateral linkage will hereinafter be referred to as quadrilateral links.

The subsidiary linkage advantageously comprises three interconnected subsidiary links, one end of one of the subsidiary links being connected to a quadrilateral link which lies in one side of the triangle formed when the retraction mechanism is in the extended position, one end of another of the subsidiary links being connected to a quadrilateral link which lies in another side of said triangle, and one end of the third of the subsidiary links being connected to a quadrilateral link which lies in the third side of the said triangle.

The retraction means may comprise jack means pivoted at one end thereof to the fixed structure at a point remote from the fixed pivot axis, and at the other end thereof to a point on one of the two quadrilateral links which align in the extended position of the quadrilateral linkage, a link of the subsidiary linkage being connected to the other of these two quadrilateral links.

According to yet another aspect of the invention there is provided an undercarriage retraction mechanism comprising a quadrilateral linkage having four links each of which is pivoted to two adjacent links about spaced parallel pivot axes, the quadrilateral linkage forming a triangle in the extended position of the retraction mechanism, the said quadrilateral linkage comprising a first and a second link which in the extended position of the retraction mechanism, are aligned with one another and constitute one side of the triangle, a third link constituted by a strut pivoted at or near one end thereof about a fixed pivot axis to a fixed structure and carrying at or near the other end thereof, ground engaging means and a fourth link, said retraction mechanism further comprising a subsidiary differential linkage connected to the strut, to the first link and to the fourth link, so that when the retraction mechanism is retracted, every point of the quadrilateral linkage moves along a predetermined locus with respect to every other point on the quadrilateral linkage, and jack means pivoted at one of its ends to the fixed structure at a point remote from the fixed pivot axis, and at the other of its ends to a point on the second link, which point is spaced from the pivot connections of the second link so that on actuation of the jack means, the point on the second link is constrained to move along a fixed locus, which locus is other than an arc of a circle centred on the fixed pivot axis.

Conveniently, the differential linkage is connected to the first, third and fourth quadrilateral links at points spaced from the pivot connections of the said quadrilateral links, and the first link is pivoted, at or near its end remote from the second link, to the third link, the jack means being connected to the second link, so that, during retraction, the second link is loaded to move the pivot connection between the first and second links away from the fixed pivot axis.

One embodiment of the invention will now be described by way of example with reference to the accompanying diagrammatic drawings, of which:

Figure 1 shows an undercarriage retraction mechanism, according to the invention, in the extended position, Figure 2 shows the mechanism of Figure 1 in the half-way retracted position, and Figure 3 shows the mechanism of Figure 1 in the fully retracted position.

Referring now to the drawings, an aircraft undercarriage mechanism of the invention comprises a main strut 11 having a main casing 16 which is pivotally connected near one end thereof about a fixed pivot axis 17 to the aircraft structure 18. The strut 11 comprises an oleo 12 having at its end remote from the fixed axis 17, a scissors-linkage 14 and a wheel-axle-carrying part 15, by means of which a pair of landing wheels 13 is carried. Connected to the aircraft structure 18 to pivot about the same fixed pivot axis 17 as, but independently of, main-strut-casing 16, is a pair of stabilising arms 19 which, due to the geometry of the linkwork herein described, lies in a plane normal to the longitudinal axis of the strut 11 when the mechanism is in its extended position as shown in Figure 1.

Pivotally connected at position 20 between the ends of the stabilising arms 19 remote from the main-strut-casing 16, is an arm 21 forming the upper arm of a folding radius-rod 22. A knuckle joint 23 is provided between this upper arm 21 and lower arm 24 of the folding radius-rod 22. The lower end of lower arm 24, as shown in Figure 1, is pivotally connected at position 25 between a pair of lugs 26 projecting from the main-strut-casing 16. A lock (not shown) is incorporated in the folding radius-rod 22 at the knuckle joint 23 to provide a means for holding the mechanism rigid in its extended position in which it takes up a triangular formation as shown in Figure 1.

A plate member 27 in the form of an elongated isosceles triangle is pivoted at its apex, to a side of the main-strut-casing 16 at a position 28 approximately half-way therealong as shown. This plate member 27 forms part of a subsidiary differential-linkage for controlling the folding movement of the radius-rod 22. At the other two corners 29 and 30 of the triangular member 27 are respectively pivoted one end of a first subsidiary link 31 and one end of a second subsidiary link 32. The other end of link 31 is pivotally connected to lower arm 24 at a position 33 approximately mid-way therealong while the other end of link 32 is pivotally connected to one of the stabilising arms 19 at a position 34 approximately midway along this arm. The plate member 27 and links 31 and 32 are duplicated on the other side of the strut 11.

A lever-member 35 is pivoted to stabilising arms 19 at position 20 in such a manner that whatever the angular position of the upper arm 21 of the folding-radius-rod 22, the lever-member 35 extends at right angles to the upper arm 21. The free end of lever-member 35 is pivotally connected at position 36 to the extremity of the piston-rod 37 of a retraction jack 38, the cylinder 39 of which is pivotally connected at position 40 to a fixed part 41 of the aircraft structure.

A suitable lock (not shown) mounted upon the aircraft structure is arranged to engage the retraction mechanism at any convenient position when the undercarriage is retracted, whereby the mechanism can be held in this position.

The upper arm 21 of the radius-rod 22 carries suitable arms 42 for abutting against stops 43 which are provided on the stabilising arms 19 in order to control the angle through which the radius-rod 22 is permitted to fold.

In operation, when the undercarriage is extended, the parts of the retraction mechanism are in a position as shown in Figure 1.

Upon initiation of the retraction movement the locking mechanism associated with the knuckle joint of the radius-rod 22 is released. Fluid pressure is applied to the annular area of the piston (not shown) of the retraction jack 38 drawing the piston into the cylinder 39. The lever 35 is thus rotated by the piston rod 37 in a clockwise direction, and since the upper arm 21 of the folding radius-rod 22 is secured at right angles with respect to the lever 35, this arm will also start to move in a clockwise direction.

As the upper arm 21 of the radius-rod 22 moves in a clockwise direction about the pivot position 20, the stabilising arms 19 also move in a clockwise direction about the pivot position 17. (Depending upon the precise geometry of the mechanism, however, the arms 19 may initially move through a small angle in the anti-clockwise direction.) At the same time the lower arm 24 of the radius-rod moves in an anti-clockwise direction about the pivot position 25. The differential linkage comprising the triangular plate member 27, link 31 and link 32, controls the movement of the stabilising arms 19 in relation to folding movement of the radius-rod 22. The differential-linkage further controls the folding movement throughout the retraction range in a manner such that the jack-stroke/retraction angle characteristics are approximately linear.

Figure 2 shows the mechanism in the half-way retracted position, in which the triangular member 27 has moved in an anti-clockwise direction with respect to the strut 11, under the control of the lower arm 24 and the strut 11. In this respect it will be understood that during the retraction movement the strut 11 rotates faster than the stabilising arms in the clockwise direction, as a result of increased anti-clockwise movement of the lower arm 24 about the pivot 25.

Broadly speaking the displacement of the stabilising arms 19 is dependent upon the relative displacement of the lower arm 24 and the strut 11.

Figure 3, in showing the mechanism in the fully retracted position, indicates that the strut 11 has almost reached the angular position of the stabilising arms 19 by virtue of its faster retraction movement under the control of the folding radius-rod 22. In consequence, the stabilising arms 19 and folding radius-rod 22 in their retracted position are substantially parallel with the casing of the strut 11. Hence a very compact retracted arrangement is achieved, and during retraction, the attitude of the retraction jack 38 remains substantially unchanged.

When it is desired to extend the undercarriage, the undercarriage uplock (not shown) is released. As pressure fluid is applied to extend the retraction jack 38 the mechanism of course operates in the reverse manner from that described above, the differential mechanism again controlling the relative folding motion of the radius-rod and stabilising arms.

When the mechanism described is in the extended position, the retraction jack 38 is in fact a strut taking the landing loads, and it is therefore necessary to provide adequate means in association with the jack 38 to lock the latter in its extended position.

Generally, a mechanism of the invention is an eight-bar linkage, the jack constituting the eighth link thereof. The eight-bar linkage is formed by a quadrilateral linkage comprising first and second alignable links constituted by the upper and lower arms 21 and 24 of radius-rod 22, a third link constituted by strut 11, and a fourth link, the subsidiary differential linkage and by the jack.

I claim:

1. An undercarriage retraction mechanism comprising a quadrilateral linkage having four links each of which is pivoted to two adjacent links about spaced parallel pivot axes, one of said links being also pivoted about a fixed pivot axis to a fixed structure, retraction means connected to the quadrilateral linkage and operable to move a point on the linkage on a locus fixed with respect to said fixed structure, which locus is other than a circular arc centered on the fixed pivot axis, and a link-guiding subsidiary linkage pivotally connected to three links of the quadrilateral linkage, the arrangement being such that said quadrilateral linkage forms a triangle in the extended position of the retraction mechanism, one side of which triangle is constituted by two links aligned with one another.

2. A mechanism as claimed in claim 1 wherein the link pivoted to the fixed structure bounds one side of the triangle formed by the quadrilateral linkage when the retraction mechanism is in the extended position and wherein this link carries ground engaging means at its end remote from the fixed pivot axis.

3. A mechanism as claimed in claim 1 wherein the subsidiary linkage comprises three interconnected subsidiary links, one end of one of the subsidiary links being connected to a quadrilateral link which lies in one side of the triangle formed when the retraction mechanism is in the extended position, one end of another of the subsidiary links being connected to a quadrilateral link which lies in another side of said triangle, and one end of the third of the subsidiary links being connected to a quadrilateral link which lies in the third side of the said triangle.

4. A mechanism as claimed in claim 3 wherein the retraction means comprise jack means pivoted at one end thereof to the fixed structure at a point remote from the fixed pivot axis, and at the other end thereof to a point on one of the two quadrilateral links which align in the extended position of the quadrilateral linkage, a link of the subsidiary linkage being connected to the other of these two quadrilateral links.

5. An undercarriage retraction mechanism comprising a quadrilateral linkage having four links each of which is pivoted to two adjacent links about spaced parallel pivot axes, the quadrilateral linkage forming a triangle in the extended position of the retractiton mechanism, the said quadrilateral linkage comprising a first and a second link which, in the extended position of the retraction mechanism, are aligned with one another and constitute one side of the triangle, a third link constituted by a strut pivoted at or near one end thereof about a fixed pivot axis to a fixed structure and carrying at or near the other end thereof, ground engaging means, and a fourth link, said retraction mechanism further comprising a subsidiary differential linkage connected to the strut, to the first link and to the fourth link, so that when the retraction mechanism is retracted, every point of the quadrilateral linkage moves along a predetermined locus with respect to every other point on the quadrilateral linkage, and jack means pivoted at one of its ends to the fixed structure at a point remote from the fixed pivot axis, and at the other of its ends to a point on the second link, which point is spaced from the pivot connections of the second link so that on actuation of the jack means, the point on the second link is constrained to move along a fixed locus, which locus is other than an arc of a circle centred on the fixed pivot axis.

6. A mechanism as claimed in claim 5 wherein the differential linkage is connected to the first, third and fourth quadrilateral linkage links at points spaced from the pivot connections of the said quadrilateral links, and the first link is pivoted, at or near its end remote from the second link, to the third link, the jack means being connected to the second link, so that, during retraction, the second link is loaded to move the pivot connection between the first and second links away from the fixed pivot axis.

7. A mechanism as claimed in claim 5 wherein the differential linkage comprises a triangular differential link pivoted at its apex to the strut and two further differential links, one of which is pivoted at one end to the first quadrilateral link and at the other end to one of the other corners of the triangular subsidiary link and the other of which differential links is pivoted at one end to the fourth quadrilateral link and at the other end to the third corner of the triangular subsidiary link.

8. An undercarriage retraction mechanism comprising a main strut pivoted at one end to a fixed part of an aircraft structure and a retraction jack pivoted to a fixed part of the aircraft structure at a point remote from that to which the main strut is pivoted, said mechanism being characterized by a main retraction linkage connected to the retraction jack for movement thereby and including a stabilizing arm pivoted to the main strut and two interconnected alignable links, one of which is pivoted to the main strut and the other of which is pivoted to the stabilizing arm, and by a link-guiding subsidiary linkage interposed between and interconnecting said main strut, said stabilizing arm and one of said alignable links to ensure that every point on the main linkage moves along a predetermined locus with respect to every other point on the main linkage.

References Cited in the file of this patent

UNITED STATES PATENTS

| 2,109,427 | Levy | Feb. 22, 1938 |
| 2,497,415 | Parker | Feb. 14, 1950 |
| 2,497,489 | Coursen et al. | Feb. 14, 1950 |

FOREIGN PATENTS

| 610,698 | Great Britain | Oct. 19, 1948 |